United States Patent [19]

Au et al.

[11] 4,173,693
[45] Nov. 6, 1979

[54] POLYMER-SUPPORTED POLY(ALKYLENEGLYCOL ETHERS)

[75] Inventors: Andrew T. Au, Newton; Harold H. Freedman, Newton Center, both of Mass.

[73] Assignee: The Dow Chemical Company, Midland, Mich.

[21] Appl. No.: 868,942

[22] Filed: Jan. 12, 1978

[51] Int. Cl.$^2$ .......................... C08F 8/00; C08F 8/18
[52] U.S. Cl. .................... 525/329; 525/340; 525/369; 525/381; 525/480; 525/498; 525/504; 525/508
[58] Field of Search ...................... 526/54, 46, 21, 20, 526/15; 528/130, 231

[56] References Cited

PUBLICATIONS

"Solid Phase Cosolvents;" Journal Am. Chem. Soc. 99:2, Jan. 19, 1977, pp. 623–625 (Regen).
"Triphase Catalysis, Kinetics of Cyanide Displacement", on 1-Bromooctane, J. Am. Chem. Soc. 98, (1976), pp. 6270–6274 (Regen).
"Solid Phase Cosolvents" J. Amer. Chem. Soc. 99:2, pp. 623–625, Jan. 19, 1977.

*Primary Examiner*—William F. Hamrock
*Attorney, Agent, or Firm*—G. R. Plotecher

[57] ABSTRACT

The title compounds are of the formula 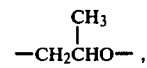 $-(O-(R-)_n R')_m$ wherein:

Ⓟ is a polymer matrix of sufficient structure and molecular weight so as to be substantially water- and hydrocarbon-insoluble;

R is $-CH_2CH_2O-$, $-CH_2CH_2CH_2O-$, $$-CH_2\overset{CH_3}{\underset{|}{C}}HO-,$$

$-CH_2CH_2CH_2CH_2O-$ or a combination thereof;

R' is hydrogen, hydrocarbyl or inertly-substituted hydrocarbyl;

n is an integer of 3 to about 40; and m is a real number such that the weight percent of $-(O-(R-)_n R')$ groups is at least about 1 percent of the total weight of the compound.

A representative example of these compounds is the reaction product of a poly(ethyleneglycol ether) having a weight average molecular weight of about 300 and a chloromethylated polystyrene resin. These polymer-supported poly (alkyleneglycol ethers) are useful phase-transfer catalysts for a wide variety of reactions, such as alkylation, displacement and carbene formation.

13 Claims, No Drawings

POLYMER-SUPPORTED POLY(ALKYLENEGLYCOL ETHERS)

BACKGROUND OF THE INVENTION

1. Field of the Invention

The invention relates to polymer- or resin-supported poly(alkyleneglycol ethers).

2. Description of the Prior Art

Poly(alkyleneglycol ethers) are known phase-transfer catalysts. Lehnskuln et al., Synth., 184 (1977) and Belgian Pat. No. 844,851. Although these catalysts are generally characterized as efficient and economical, their wide-spread use has been hindered by the difficulties encountered in separating and recovering these catalysts from a reaction product.

SUMMARY OF THE INVENTION

According to this invention, the difficulties encountered in separating and recovering a poly(alkyleneglycol ether) from a reaction product are overcome if the poly(alkyleneglycol ether) is supported on a substantially water- and hydrocarbon-insoluble polymer matrix prior to its use as a catalyst. The resulting compound is an immobilized catalyst of the formula $$(P)\text{-}(O\text{-}(R)_n R')_m \qquad (I)$$

wherein:

(P) is a polymer matrix of sufficient structure and molecular weight so as to be substantially water- and hydrocarbon-insoluble;

R is —CH$_2$CH$_2$O—, —CH$_2$CH$_2$CH$_2$O—, $$-CH_2\overset{\overset{\displaystyle CH_3}{|}}{C}HO-,$$

—CH$_2$CH$_2$CH$_2$CH$_2$O— or a combination thereof;

R' is hydrogen, hydrocarbyl or an inertly-substituted hydrocarbyl;

n is an integer of 3 to about 40; and m is a real number such that the weight percent of —O—R—$_n$R') groups is at least about 1 percent of the total weight of the compound.

These polymer-supported, phase-transfer catalysts are readily prepared and have utility in a wide variety of reactions. Moreover, these catalysts can be repeatedly recycled with little or no loss of activity.

DETAILED DESCRIPTION OF THE INVENTION

The polymer matrix ((P)) of I can comprise essentially any composition of sufficient structure and molecular weight so as to be substantially water- and hydrocarbon-insoluble. A nonlimiting illustration of compositions include: polystyrene, styrene-divinylbenzene, styrene-glycoldimethacrylate, urea-formaldehyde, aryl/-polyamine-formaldehyde, phenol-formaldehyde, polyacrylate, etc. Typically the polymer matrix is crosslinked and is of either a swellable gel or a micro- or macroporous bead form. Polymer matrices derived from chloromethylated polystyrene or styrene-divinylbenzene resin beads having an exchange capacity of at least about 1 milliequivalent per gram of dry resin are preferred.

The poly(alkyleneglycol ethers) of this invention are of the formula $$HO\text{-}(R)_n R' \qquad (II)$$

wherein, R, R' and n are as previously defined. Preferably R is —CH$_2$CH$_2$O—, $$-CH_2\overset{\overset{\displaystyle CH_3}{|}}{C}HO-$$

or —CH$_2$CH$_2$CH$_2$O— and most preferably —CH$_2$CH$_2$O—. Illustrative R' hydrocarbyls include: methyl, ethyl, propyl, isopropyl, butyl, pentyl, neopentyl, octyl, dodecyl, octadecyl, cyclopentyl, cyclohexyl, phenyl, tolyl, benzyl, xylyl, phenethyl, and the like. The term "inertly-substituted hydrocarbyl" here means that the R' hydrocarbyls can bear substituents that will not preclude the catalytic properties of I. Inert-substituents include: hydroxyl, sulfhydryl, sulfate, nitro, ester, ether oxygen, acyl, alkenyl unsaturation, and the like. Representative inertly-substituted hydrocarbyls include: hydroxyethyl, hydroxypropyl, hydroxyoctyl, phenoxide, cyclopentenyl, dicyclopentenyl, 1-octenyl, acetyl, propynyl, lauryl, stearyl, linolyl, phenylacetyl, benzoyl, etc. Preferably R' is a hydrocarbyl of 1 to about 30 carbon atoms and most preferably a hydrocarbyl of 1 to about 15 carbon atoms.

Poly(alkyleneglycol ethers) having a weight average molecular weight of at least about 300 are preferred and poly(alkyleneglycol ethers) wherein R is —CH$_2$CH$_2$O—, $$-CH_2\overset{\overset{\displaystyle CH_3}{|}}{C}HO-$$

or —CH$_2$CH$_2$CH$_2$O—, R' is a hydrocarbyl of 1 to about 30 carbon atoms, and n is at least 3 are more preferred. Poly(alkyleneglycol ethers) wherein R is —CH$_2$CH$_2$O—, R' is a hydrocarbyl of 1 to about 15 carbon atoms, and n is at least 6 are especially preferred.

The m in formula I represents the average number of —O—(R)$_n$R') groups per polymer matrix. Compounds wherein m is an average number such that the weight percent of —O—(R)$_n$R') groups is at least about 10 percent of the total weight of the compound, i.e., I, are preferred and compounds wherein m is an average number such that the weight percent of —O—(R)$_n$R') groups is at least about 20 percent are especially preferred.

Although the compounds of this invention can be prepared by any convenient process, a preferred process comprises contacting at a temperature between about 25° C. and 100° C. and a polymer:poly(alkyleneglycol ether) mole equivalent ratio of at least about 0.3:

(a) a substantially water- and hydrocarbon-insoluble polymer; with
(b) a poly(alkyleneglycol ether); and
(c) an alkali or alkaline earth metal hydroxide; in the presence of
(d) a catalytic amount of a quaternary ammonium or phosphonium salt; and
(e) an organic solvent capable of swelling the polymer.

The polymers of (a) comprise a substantially water- and hydrocarbon-insoluble polymer matrix (of the same description as (P)) and pendent, reactive leaving groups. These leaving groups are displaceable by poly- (alkyleneglycol ethers) under base-catalyzed conditions but are essentially inert to base-catalyzed hydrolysis. "Base" in the term "base-catalyzed" refers to alkali and alkaline earth metal hydroxides. Exemplary leaving groups include: chloride, bromide, fluoride, iodide, tosylate, acetate, bisulfate, etc. Chloride and bromide are the preferred leaving groups. Chloromethylated polystyrene or styrene-divinylbenzene resin beads having an exchange capacity of at least about 1 milliequivalent per gram of dry resin are the preferred polymers.

The poly(alkyleneglycol ethers) of (b) are of the same description as II.

Any solid or liquid hydroxide derived from an alkali or alkaline earth metal can here be used. For reasons of familiarity and availability, sodium and potassium hydroxide, either liquid or solid, are preferred. Although a stoichiometric amount of hydroxide is sufficient, the use of excess hydroxide is preferred.

The quaternary ammonium and phosphonium salts here used are known phase-transfer catalysts. These onium salts are described by Starks and Napier in Br. Pat. 1,227,144 and by Starks in J. Amer. Chem. Soc., 93, 195 (1971). Suitable onium salts have a minimum solubility of at least about 1 weight percent in both the organic and the aqueous phase at 25° C. Ammonium salts are preferred over phosphonium salts and tri-n-butylmethyl-, triphenylmethyl-, benzyltriethyl-, and tetra-n-butylammonium chlorides, bromides and bisulfates are most preferred.

As a further illustration of the type of onium salts here used, suitable onium salts are represented by the formula

$$R''R^{III}R^{IV}R^{V}Q^{\oplus}A^{\ominus} \qquad (III)$$

wherein $Q^{\oplus}$ is a quaternized nitrogen or phosphorus atom, $R''$-$R^V$ are hydrocarbyl groups, e.g., alkyl, aryl, alkylaryl, cycloalkyl, etc., and $R''$ can join with $R^{III}$, $R^{III}$ with $R^{IV}$, etc. to form a 5- or 6-membered heterocyclic compound having at least one quaternized nitrogen or phosphorus atom in the ring and can also contain one nonadjacent atom of nitrogen, sulfur or oxygen within the ring. Typically, $R''$-$R^V$ are hydrocarbyl groups of from 1 to about 16 carbon atoms each with a combined minimum total of about 10 carbon atoms. Preferred onium salts have from 10 to about 30 carbon atoms.

The neutralizing anion portion of the salt, i.e., $A^{\ominus}$ in formula III, may be varied to convenience. Chloride and bisulfate are the preferred anions but other representative anions include fluoride, bromide, iodide, tosylate, acetate, etc. The following compounds are a nonlimiting illustration: tetraalkylammonium salts, such as tetra-n-butyl-, tri-n-butylmethyl-, tetrahexyl-, trioctylmethyl-, hexadecyltriethyl-, and tridecylmethylammonium chlorides, bromides, iodides, bisulfates, tosylates, etc.; alkylaryl ammonium salts, such as tetrabenzyl-, benzyltrimethyl-, benzyltriethyl-, benzyltributyl-, and phenethyltrimethylammonium chlorides, bromides, iodides, etc.; arylammonium salts, such as triphenylmethyl-, ammonium fluoride, chloride or bromide, N,N,N-trimethyl-n-phenylammonium chloride, N,N,N-triethyl-N-phenylammonium bromide, N,N-diethyl-N,N-diphenylammonium bisulfate, trimethylnaphthylammonium chloride, p-methylphenyltrimethylammonium chloride or tosylate, etc.; 5- and 6-membered heterocyclic compounds containing at least one quaternary nitrogen atom in the ring, such as N,N-dibutylmorpholinium chloride, etc.; and the corresponding phosphonium salts.

A catalytic amount of a quaternary ammonium or phosphonium salt is here used. The concentration will vary with the particular reagents employed but best results are generally achieved when the maximum onium salt:polymer mole equivalents ratio is about 10:1. Preferably, the maximum mole equivalents ratio is about 1:1 and most preferably about 0.5:1. The minimum onium salt:polymer mole equivalents ratio generally employed is about 0.1:1 and preferably about 0.3:1.

Any organic solvent capable of swelling the polymer can be employed in this preferred process for synthesizing the compounds of this invention. Relatively nonpolar solvents are preferred, such as benzene, toluene, xylene, hexane, cyclohexane, etc., but various polar solvents, such as tetrahydrofuran, etc., can also be used. Sufficient solvent to both dissolve the poly(alkyleneglycol ether) and to swell the polymer is generally employed.

Stoichiometric amounts of poly(alkyleneglycol ether) and polymer are contacted in the practice of this preferred process. Accordingly, the typical minimum poly(alkyleneglycol ether):polymer mole equivalents ratio here used is at least about 1:1 and preferably at least about 2:1. Practical considerations, such as economy, bead swelling, etc., are the only limitations upon the maximum poly(alkyleneglycol ether):polymer mole equivalents ratio that can be used but the typical maximum ratio is about 10:1 and preferably about 3:1.

Although the contacting can be conducted at a temperature between about 25° C. and about 100° C., a maximum temperature of about 80° C. is preferred because higher temperatures tend to significantly decompose the onium salts. However, temperatures in excess of about 80° C. can be used if the onium salt is added to the reaction mixture in portions over an extended period of time. This manner of onium salt addition greatly minimizes the salt's decomposition. A preferred minimum contacting temperature is about 50° C.

Pressure considerations are not critical to this preferred process except as they relate to temperature. The synthesis process is most often conducted at autogenous pressure which is typically atmospheric.

Reaction or residence time can vary widely depending upon the extent of reaction desired, temperature, reactants, etc. Generally, a residence time of about 10 hours at preferred reaction conditions with preferred reaction reagents is sufficient to yield a highly active, immobilized catalyst. Again, only practical considerations limit the maximum residence time although times in excess of about 20 hours are seldom employed.

The polymer-supported compounds of this invention are useful as phase-transfer catalysts in a wide variety of applications. Generally, these catalysts are useful in any organic reactions involving alkali or alkaline earth metal salts or any organic reaction that can be catalyzed by a crown ether. Illustrative reactions include: alkylations, displacement reactions involving such anions as halides, cyanide, thiocyanate etc., and carbene formation. However, the immobilized catalysts of this invention permit these standard reactions to proceed at less rigorous conditions, in the absence of undesirable yet conventional solvents (such as dimethylsulfoxide, dimethylformamide and hexamethylphosphormamide), and without complex recovery procedures. For example, the immobilized catalysts can be conveniently recovered by simple filtration. Moreover, the catalysts of this invention are recyclable showing little or no loss of activity after repeated use.

The following examples are illustrative embodiments of this invention. Unless indicated to the contrary, all parts and percentages are by weight.

SPECIFIC EMBODIMENTS

EXAMPLE 1: Polymer-supported Poly(Alkyleneglycol Ether) Preparation

A mixture of chloromethylated polystyrene beads (2 g, 1 meq Cl/g), a poly(alkyleneglycol ether) of the formula $$C_{13}H_{27}(OCH_2CH_2)_{6.5}OH \quad (IV)$$

(2 g, 4.1 meq) and ground solid sodium hydroxide (2 g) was stirred in tetrahydrofuran (15 ml) at about 65° C. Tetra-n-butylammonium chloride (0.9 g) was added in portions over a period of 8 hours. After 15 hours of continuous stirring, the mixture was cooled, diluted with water and filtered. The recovered beads were then washed with a saturated ammonium chloride solution, followed by water, acetone, methylene chloride and were subsequently stirred in refluxing tetrahydrofuran for about 2 hours to eliminate any adsorbed poly(alkyleneglycol ether). The beads were then filtered, washed with acetone and dried at about 80° C. under vacuum to a constant weight. The resulting catalyst was estimated to have about a 45 percent poly(alkyleneglycol ether) substitution.

EXAMPLES 2-5

The procedure of Example 1 was repeated except that various poly(alkyleneglycol ethers) were substituted for IV of Example 1. The polyglycol ethers of these examples were of the formula $$HO\text{-}(CH_2CH_2O)_n\text{-}R' \quad (V)$$

wherein n and R' were the following for the respective examples:

| Example | n | R' | % Displacement |
|---|---|---|---|
| 2 | 8 | Phenyl (—$C_6H_5$) | 52.9 |
| 3 | 10 | Methyl (—$CH_3$) | 61.1 |
| 4 | 12 | Tridecyl (—$C_{13}H_{27}$) | 54.7 |
| 5 | 20 | Phenyl (—$C_6H_5$) | — |

The column captioned by "% Displacement" indicates the degree of poly(alkyleneglycol ether) substitution in each example.

EXAMPLES 6-19: Displacement Reactions

The following examples illustrate displacement reactions of the equation $$\text{n—}C_8H_{17}Br + MY \xrightarrow{IM\text{-}CAT} \text{n—}C_8H_{17}Y + MBr$$

wherein M is a sodium or potassium cation, Y is a neutralizing anion for M, and IM-CAT is the immobilized catalyst. The MY compound was introduced as a solid, toluene was used as a solvent, and the reagents were contacted at about 80° C. for about 5 hours.

As here used, "yield" means the percent of the theoretical yield for n—$C_8H_{17}Y$ formed under the specified conditions as measured by gas chromatography with 1,2,3,4-tetramethylbenzene as an internal standard.

Examples 6-9 employed about 5.7 mole percent of the catalyst prepared in Example 1. The results are reported in Table I.

TABLE I

Ⓟ—O-(CH$_2$CH$_2$O)$_{6.5}$—C$_{13}$H$_{27}$ CATALYZED REACTION VI

| Ex. | M | Y | n-$C_8H_{17}Y$ (% Yield) |
|---|---|---|---|
| 6 | Na | Iodide (I$^-$) | 53.0 |
| 7 | Na | Thiocyanate (SCN$^-$) | 23.3 |
| 8 | Na | Phenate ($\phi$-O$^-$) | 29.0 |
| 9 | Na | Pyridinolate  | 54[1] |

[1]Blank corrected yield.

The catalyst of Examples 6 and 7 was recycled 5 times for each particular reaction with no apparent loss of catalytic activity.

Examples 10 and 11 also used a catalyst prepared according to the procedure of Example 1 at the same concentration (about 5.7 mole percent) but employed different MY compounds. Results are reported in Table II.

TABLE II

Ⓟ—O-(CH$_2$CH$_2$O)$_{6.5}$C$_{13}$H$_{27}$ CATALYZED REACTION VI

| Ex. | M | Y | n-$C_8H_{17}Y$ (% Yield) |
|---|---|---|---|
| 10 | K | Thiocyanate (SCN$^-$) | 27.9 |
| 11 | K | Phenate ($\phi$-O$^-$) | 56.4 |

Example 12 employed a catalyst prepared by the procedure of Example 2 at a concentration of about 6.4 mole percent with sodium iodide as the MY compound. The yield of n—$C_8H_{17}Y$ (i.e., n—$C_8H_{17}I$) was about 59 percent.

Example 13 employed a catalyst prepared by the procedure of Example 3 at a concentration of about 7.2 mole percent with sodium iodide as the MY compound. The yield of n—$C_8H_{17}Y$ (i.e., n—$C_8H_{17}I$) was about 28.7 percent.

Examples 14-16 employed a catalyst prepared by the procedure of Example 4 at a concentration of about 5.7 mole percent. Results are reported in Table III.

TABLE III

Ⓟ—O-(CH$_2$CH$_2$O)$_{12}$C$_{13}$H$_{27}$ CATALYZED REACTION VI

| Ex. | M | Y | n-$C_8H_{17}Y$ (% Yield) |
|---|---|---|---|
| 14 | Na | Iodide (I$^-$) | 87.0 |
| 15 | Na | Thiocyanate (SCN$^-$) | 85.1 |
| 16 | Na | Phenate ($\phi$-O$^-$) | 24.2 |

Examples 17 and 18 also employed a catalyst prepared by the procedure of Example 4 with a concentration of about 5.7 mole percent but employed a different MY compound. The results are reported in Table IV.

TABLE IV

Ⓟ—O-(CH$_2$CH$_2$O)$_{20}\phi$ CATALYZED REACTION VI

| Ex. | M | Y | n-$C_8H_{17}Y$ (% Yield) |
|---|---|---|---|
| 17 | K | Thiocyanate (SCN$^-$) | 34.9 |
| 18 | K | Phenate ($\phi$-O$^-$) | 82.3 |

Example 19 employed a catalyst prepared by the procedure of Example 5 at a concentration of about 10 mole percent with sodium iodide as the MY compound. The yield of n—$C_8H_{17}Y$ was about 50.8 percent.

Control

Examples 1-18 were repeated except no catalyst was employed. Only negligible yields were detected.

The preceding examples of this invention are for illustrative purposes only and it is understood that various changes can be resorted to without departing from either the spirit of the invention or the scope of the adjoining claims.

What is claimed is:

1. A compound of the formula $$\text{\textcircled{P}} \ (\!-\!O\!-\!(\!R\!-\!)\!_n R')_m$$

wherein:

\textcircled{P} is a polymer matrix of sufficient structure and molecular weight so as to be substantially water- and hydrocarbon-insoluble;

R is —$CH_2CH_2O$—, —$CH_2CH_2CH_2O$—, $$-CH_2\underset{\underset{CH_3}{|}}{CH}O-,$$

—$CH_2CH_2CH_2CH_2O$— or a combination thereof;

R' is hydrogen, hydrocarbyl or an inertly-substituted hydrocarbyl;

n is an integer of 3 to about 40; and m is a real number such that the weight percent of $-(O-(R)-_nR')$ groups is at least about 1 percent of the total weight of the compound.

2. The compound of claim 1 wherein R' is a hydrocarbyl of 1 to about 30 carbon atoms.

3. The compound of claim 1 wherein R is —$CH_2CH_2O$—, $$-CH_2\underset{\underset{CH_3}{|}}{CH}O-$$

or —$CH_2CH_2CH_2O$—.

4. The compound of claim 1 wherein m is a real number such that the weight percent of $(-O-R-_nR')$ groups is at least about 10 weight percent of the total weight of the compound.

5. The compound of claim 1 wherein R is —$CH_2CH_2O$—.

6. The compound of claim 5 wherein n is at least 6.

7. The compound of claim 6 wherein R' is a hydrocarbyl of 1 to about 15 carbon atoms.

8. The compound of claim 7 wherein P is a cross-linked matrix of polystyrene, styrene-divinylbenzene, styrene-glycoldimethacrylate, urea-formaldehyde, aryl/polyamine-formaldehyde, phenol-formaldehyde or polyacrylate.

9. A compound of the formula $$\text{\textcircled{P}} \ (\!-\!O\!-\!(\!R\!-\!)\!_n R')_m$$

wherein:

\textcircled{P} is a cross-linked polystyrene matrix;

R is —$CH_2CH_2O$—, —$CH_2CH_2CH_2O$—, —$CH_2CH_2CH_2CH_2O$— or a combination thereof;

R' is hydrogen, hydrocarbyl or an inertly-substituted hydrocarbyl;

n is an integer of 3 to about 40; and m is a real number such that the weight percent of $-(O-(R)-_nR')$ groups is at least about 1 percent of the total weight of the compound.

10. The compound of claim 9 wherein m is a real number such that the weight percent of —O—R—$_n$R') groups is at least about 20 weight percent of the total weight of the polymer.

11. The compound of claim 10 wherein R' is methyl.

12. The compound of claim 10 wherein R' is tridecyl.

13. The compound of claim 10 wherein R' is phenyl.

* * * * *

UNITED STATES PATENT AND TRADEMARK OFFICE
CERTIFICATE OF CORRECTION

PATENT NO. : 4,173,693
DATED : November 6, 1979
INVENTOR(S) : Andrew T. Au and Harold H. Freedman It is certified that error appears in the above-identified patent and that said Letters Patent are hereby corrected as shown below:

Col. 1, line 43, "-O-R-$_n$R')" should read -- $\{O\{R\)\}_n$R') --.

Col. 5, line 58, "n-C$_8$H$_{17}$Br + $\xrightarrow{\text{MY} \quad \text{IM-CAT}}$n-C$_8$H$_{17}$Y + MBr" should read -- (VI)  n-C$_8$H$_{17}$Br + MY $\xrightarrow{\text{IM-CAT}}$ n-C$_8$H$_{17}$Y + MBr --

Col. 6, line 4, caption for table -- Table I --.

Col. 8, line 8, "-O-R-$_n$R')" should read -- $\{O\{R\}\}_n$R') --.

Col. 8, line 35, "-O-R-$_n$R')" should read -- $\{O\{R\}\}_n$R') --.

Signed and Sealed this

Twelfth Day of February 1980

[SEAL]

Attest:

SIDNEY A. DIAMOND

Attesting Officer

Commissioner of Patents and Trademarks